US006821020B2

(12) United States Patent
Chen (10) Patent No.: US 6,821,020 B2
(45) Date of Patent: Nov. 23, 2004

(54) SLIDER FOR A LINER GUIDE (75) Inventor: Kuo-Tsai Chen, Taichung Hsein (TW)

(73) Assignee: Advanced Motion Technologies Corp., Taichung Hsien (TW)

( * ) Notice: Subject to any disclaimer, the term of this patent is extended or adjusted under 35 U.S.C. 154(b) by 77 days.

(21) Appl. No.: 10/376,307

(22) Filed: Mar. 3, 2003

(65) Prior Publication Data
US 2004/0175061 A1 Sep. 9, 2004

(51) Int. Cl.[7] .............................................. F16C 29/06
(52) U.S. Cl. ........................................ 384/45; 384/13
(58) Field of Search .............................. 384/45, 44, 43, 384/13

(56) References Cited

U.S. PATENT DOCUMENTS 4,929,095 A * 5/1990 Osawa ........................ 384/45
5,492,412 A * 2/1996 Tsukada ...................... 384/15
5,584,581 A * 12/1996 Keller et al. ................. 384/13
5,588,750 A * 12/1996 Osawa et al. ................ 384/45
5,758,975 A * 6/1998 Kuo ............................ 384/45

* cited by examiner

Primary Examiner—Thomas R. Hannon
(74) Attorney, Agent, or Firm—Troxell Law Office PLLC (57) ABSTRACT A slider for a liner guide has an inverse U-shaped body, two side covers and a retainer. The body has ball channels to rotatably receive balls. The side covers are respectively attached to ends of the body and each has an oil channel communicating with the ball channels in the body. The retainer is attached between the side covers and to the bottom of the bridge of the body to keep the balls received in the ball channels near the bottom of the bridge from escaping from the corresponding ball channel. The retainer has a resilient hole, such that the retainer can be attached to and detached from the body in a sequential process. To assemble the slider is simplified and easy. In addition, the slider further has a parallel oil channel system to synchronously feed lubricant oil into the ball channels in the slider.

5 Claims, 9 Drawing Sheets

SLIDER FOR A LINER GUIDE

BACKGROUND OF THE INVENTION

1. Field of the Invention

The present invention relates to a slider, and more particularly to a slider for a liner guide.

2. Description of Related Art

Figure 6:
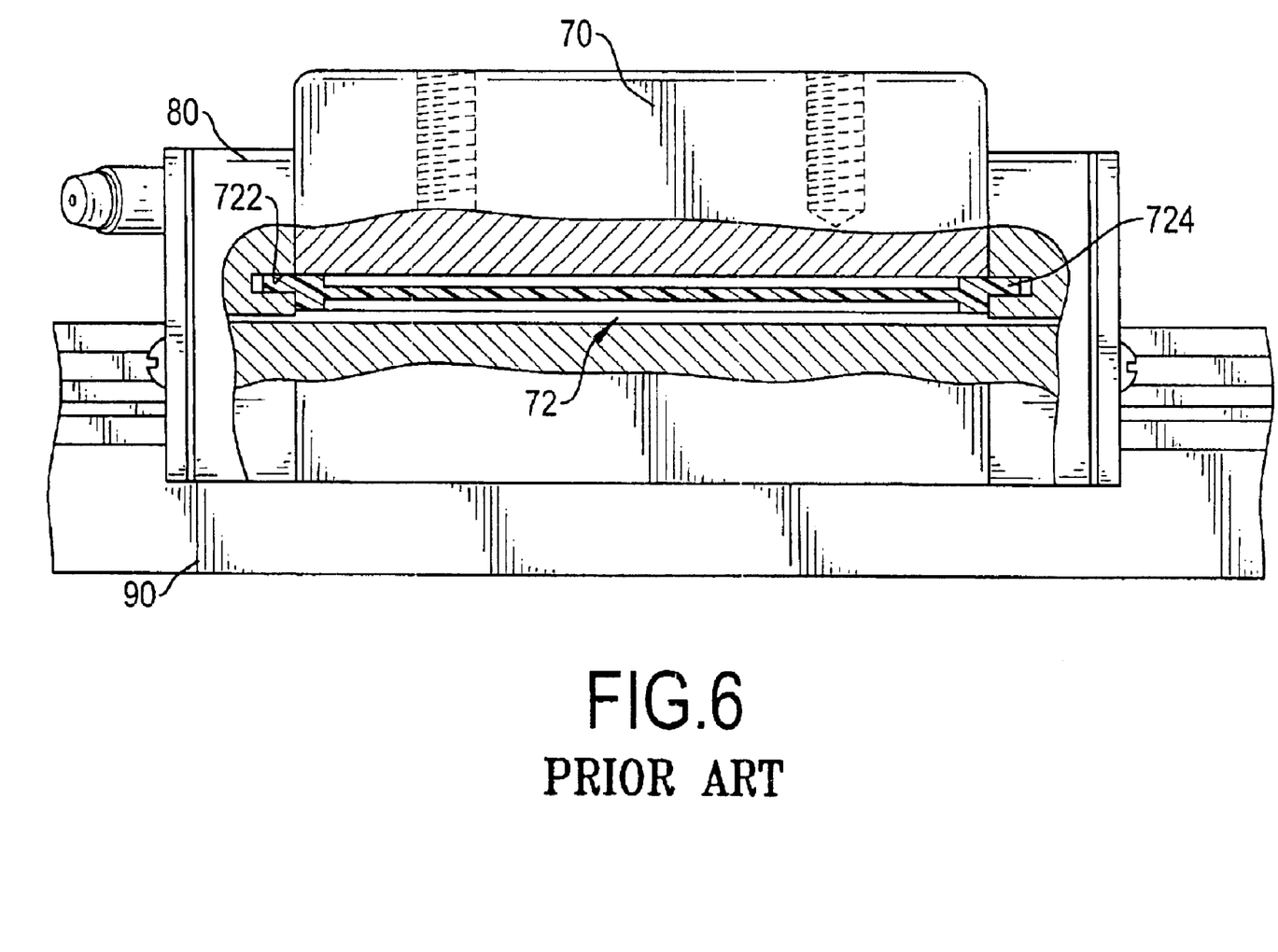
FIG. 6 is a side plan view in partial cross section of a liner guide with a rail and a conventional slider in accordance with the prior art.
Figure 7:
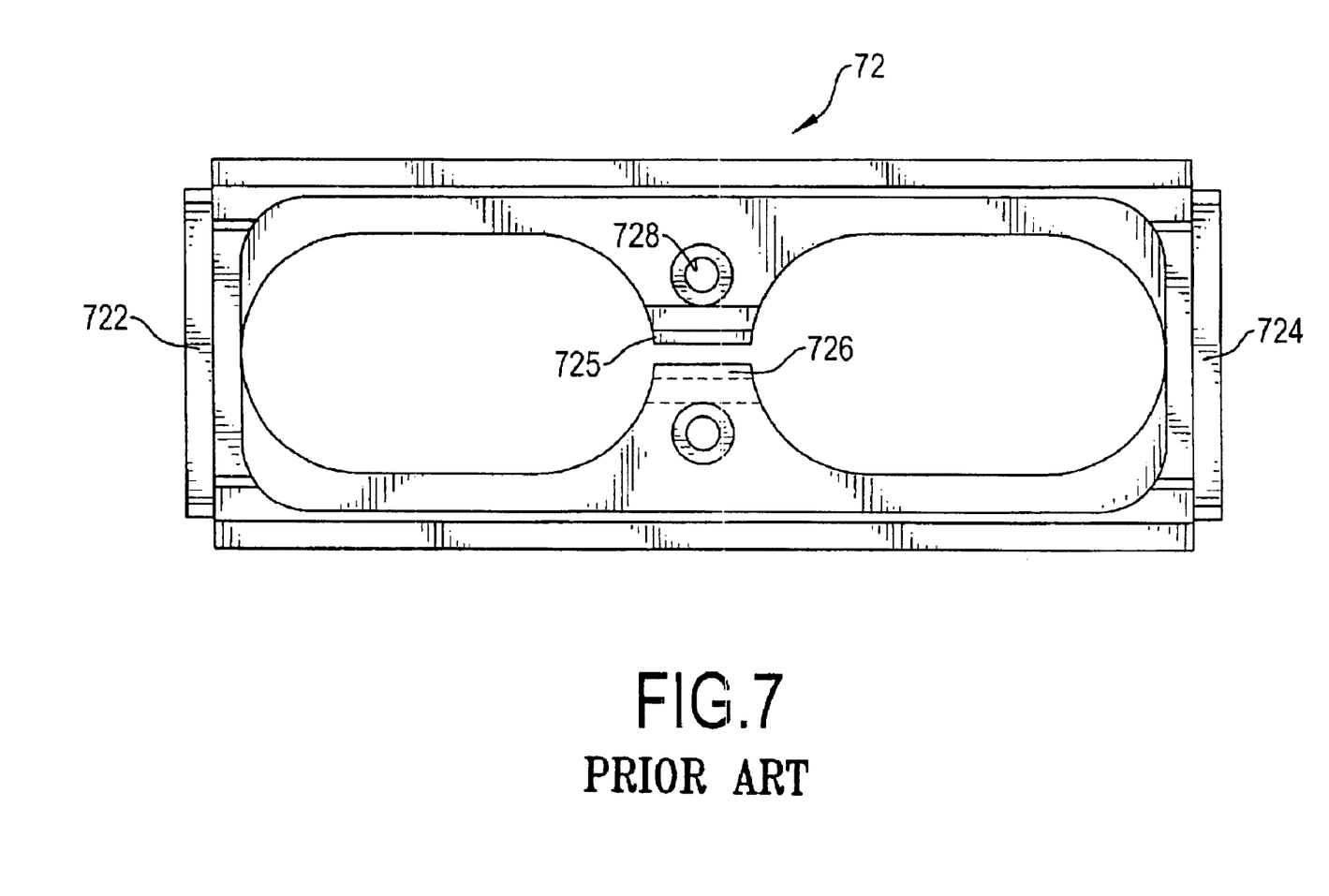
FIG. 7 is a top plan view of a conventional retainer of the slider in FIG. 6.

A liner guide is mounted between two objects to make the objects smoothly move relative to each other, With reference to FIG. 6, a conventional liner guide comprises a slider and a rail (90). The slider is slidably mounted on the rail (90) and has an inverse U-shaped body (70). Two ball channels (not shown) are respectively defined in each side of the body (70) of the slider, and multiple balls (not shown) are rotatably received in each respective ball channel. Two side covers (80) are respectively attached to two ends of the body (70). An oil channel is defined in each respective side cover (80), such that lubricant oil can be applied to the ball channels through the oil channels in the side covers (80). In addition, a retainer (72) is attached to the body (70) to keep the balls in the ball channels near the bottom of the body (70) from escaping from the corresponding ball channels. With reference to FIGS. 6 and 7, a conventional retainer (72) of the conventional slider has a rectangular frame with two long sides and two short sides. Two tabs (722,724) respectively extend from two short sides of the rectangular frame to engage with the side covers (80). Two hooks (725,726) are formed on the middle portion of the frame, and two holes (728) are defined in the middle portion of the frame. After attaching the retainer (72) to the body (70) of the slider, the long sides of the retainer will face and block parts of openings of the ball channels. Consequently, the openings of the ball channels will be reduced to be smaller than the diameter of the balls, such that the balls will be kept from escaping from the ball channels.

However, with the structure of the conventional of the retainer (72), the retainer (72) cannot be assembled to the body (70) of the slider after the side covers (80) have been assembled to the body (70). The conventional retainer (72) must be simultaneously assembled to the body (70) while the side covers (80) are assembled to the body (70). Therefore, attaching the conventional retainer (72) to the body (70) of the slider is before inserting the balls into the ball channels. To insert the balls into the ball channel through the openings of the ball channel blocked by the retainer (72), the middle portion of the rectangular frame of the retainer (72) must be squeezed to enlarge the openings of the ball channel to allow the balls to pass. Accordingly, a tool extends through the through holes (827) and makes the hooks (725,726) engage with each other, such that the middle portion of the retainer (72) will be deformed so as to enlarge the openings of the ball channels. After the balls have been fed into the ball channel, the hooks (725,726) are released. Therefore, to assemble the conventional slider with a convention retainer (72) is troublesome and difficult.

Figure 8:
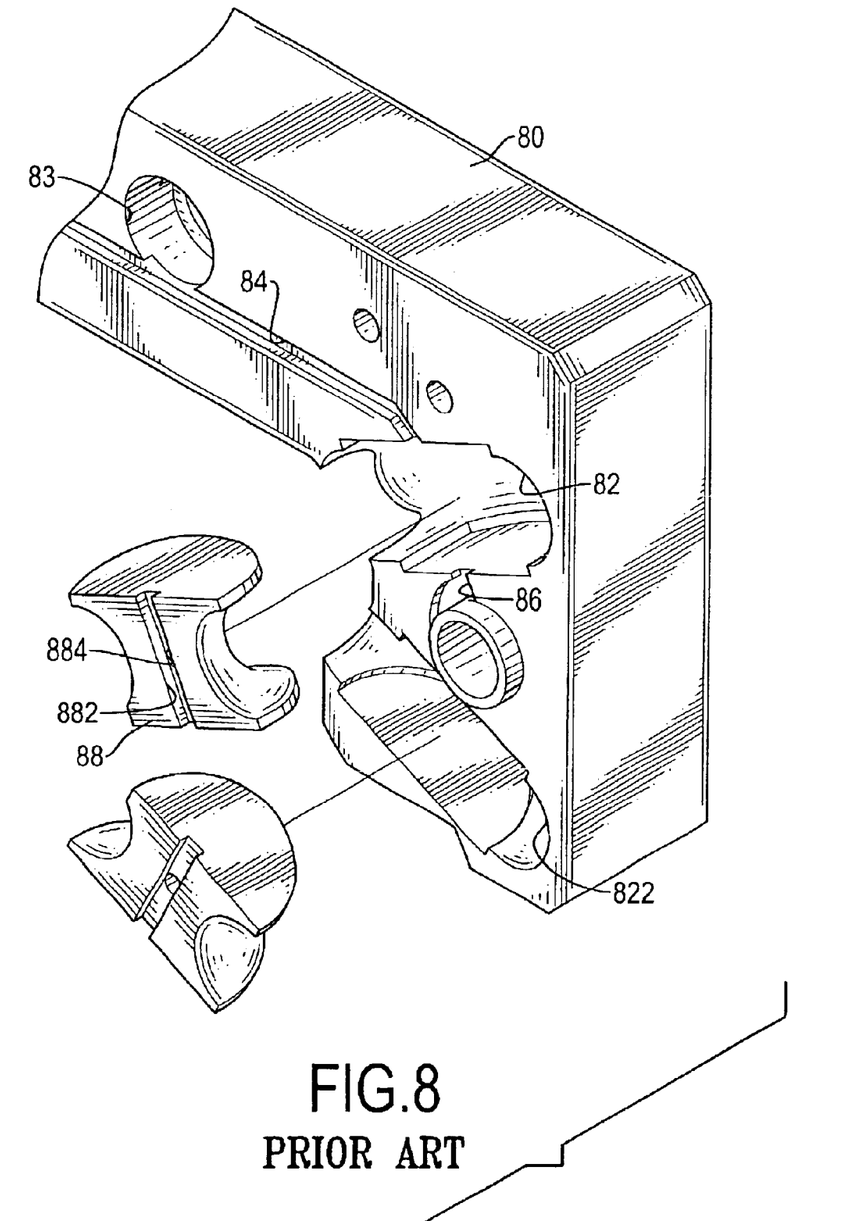
FIG. 8 is an exploded perspective view of a conventional side cover of a conventional slider in accordance with the prior art.
Figure 9:
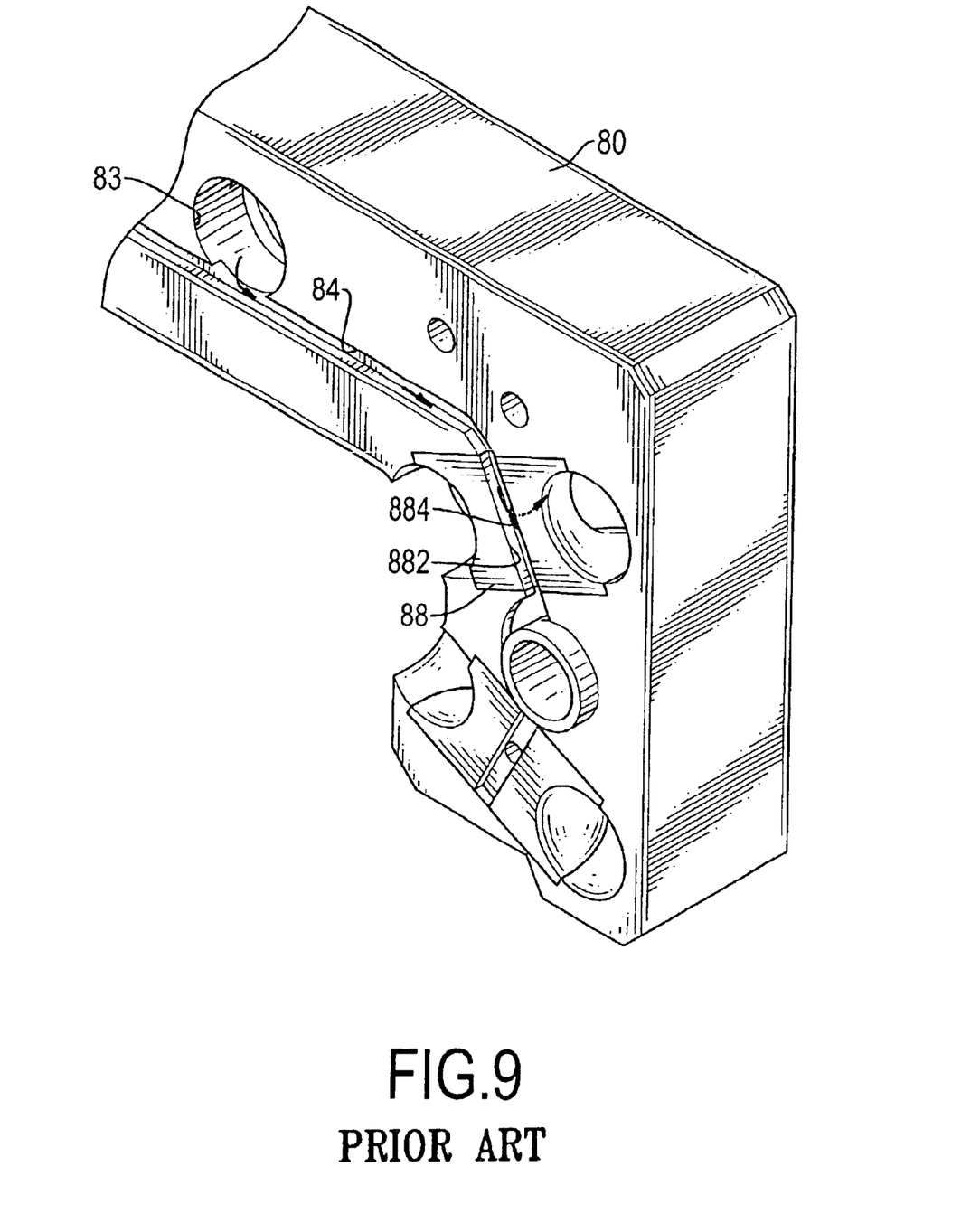
FIG. 9 is an enlarged perspective view of the conventional side cover in FIG. 8.

With reference to FIGS. 6, 8 and 9, the oil channel in each side cover (80) comprises an inlet (83), a branch channel (84), a connecting channel (86), two guiding channels (882) and two connecting holes (884). The inlet (83) is defined in the side cover (80). The branch channel (84) communicates wit h the inlet (83) and has two ends respectively extending to two sides of the side cover (80). Two cavities (82,822) are defined in each respective side of the side cover (80) and respectively communicate with two ball channels in the corresponding side of the body (70). Two guiding cover (88) are attached to the side cover (80) and respectively corresponding to the cavities (82,822). The guiding channels (882) are respectively defined in the guiding covers (88). The guiding channel (882) in the guiding cover (88) corresponding to the first cavity (82) communicates with one end of the branch channel (84), and the guiding channels (882) in the guiding covers (88) communicate with the connecting channel (86). The guiding holes (884) respectively communicate with the cavities (82,82). When lubricant oil is injected from the inlet (83), the lubricant oil will be led into the first cavity (82) through the branch channel (84), the guiding channel (882) and the guiding hole (884) in the corresponding guiding cover (88), and the ball channel communicating with the first cavity (82) will be filled with the lubricant oil. Then, the lubricant oil will be led into the second cavity (822) through the connecting channel (86), the guiding channel (882) and the guiding hole (884) in the corresponding guiding cover (88), and the ball channel communicating with the second cavity (822) will also be filled with the lubricant oil. The lubricant oil can make the slider move on the rail (90) smoothly and keep the balls from wear.

However, the conventional oil channel in the side cover (80) is a serial oil channel. This means that the lubricant must completely fill in the ball channel communicating with the first cavity (82) firstly before the lubricant oil is applied to the ball channel communicating with the second cavity (822). The lubricant oil filling the ball channel communicating with the second cavity (822) is always less then that filling the ball channel communicating with the first cavity (82). This will make the friction between the balls in one ball channel and the rail (90) different from that between the ball in another ball channel and the rail, and this will make unstable movement to the slider. In addition, the wear of the balls in different ball channels is also different, and this will shorten the useful life of the slider.

To overcome the shortcomings, the present invention tends to provide a slider for a liner guide apparatus to mitigate or obviate the aforementioned problems.

SUMMARY OF THE INVENTION

The main objective of the invention is to provide a slider for a liner guide and that is easily assembled and has a parallel oil channel system to synchronously feed lubricant oil into all ball channels in the slider. The slider has an inverse U-shaped body, two side covers and a retainer. The body has two sides each having two ball channels. Multiple balls are rotatably received in each respectively ball channel. The side covers are respectively attached to ends of the body and each has an oil channel communicating with the ball channels in the body. The retainer is attached between the side covers and to the bottom of the bridge of the body to keep the balls received in the ball channels near the bottom of the bridge from escaping from the corresponding ball channel. The retainer has a rectangular frame and a resilient hole defined near one end of the rectangular frame to make the rectangular frame have a resilient capability. Consequently, the retainer can be assembled to the body after the balls being inserted into the ball channels in the body, such that to assemble the slider is simplified and easy.

Other objects, advantages and novel features of the invention will become more apparent from the following detailed description when taken in conjunction with the accompanying drawings.

DETAILED DESCRIPTION OF PREFERRED EMBODIMENT

Figure 1:
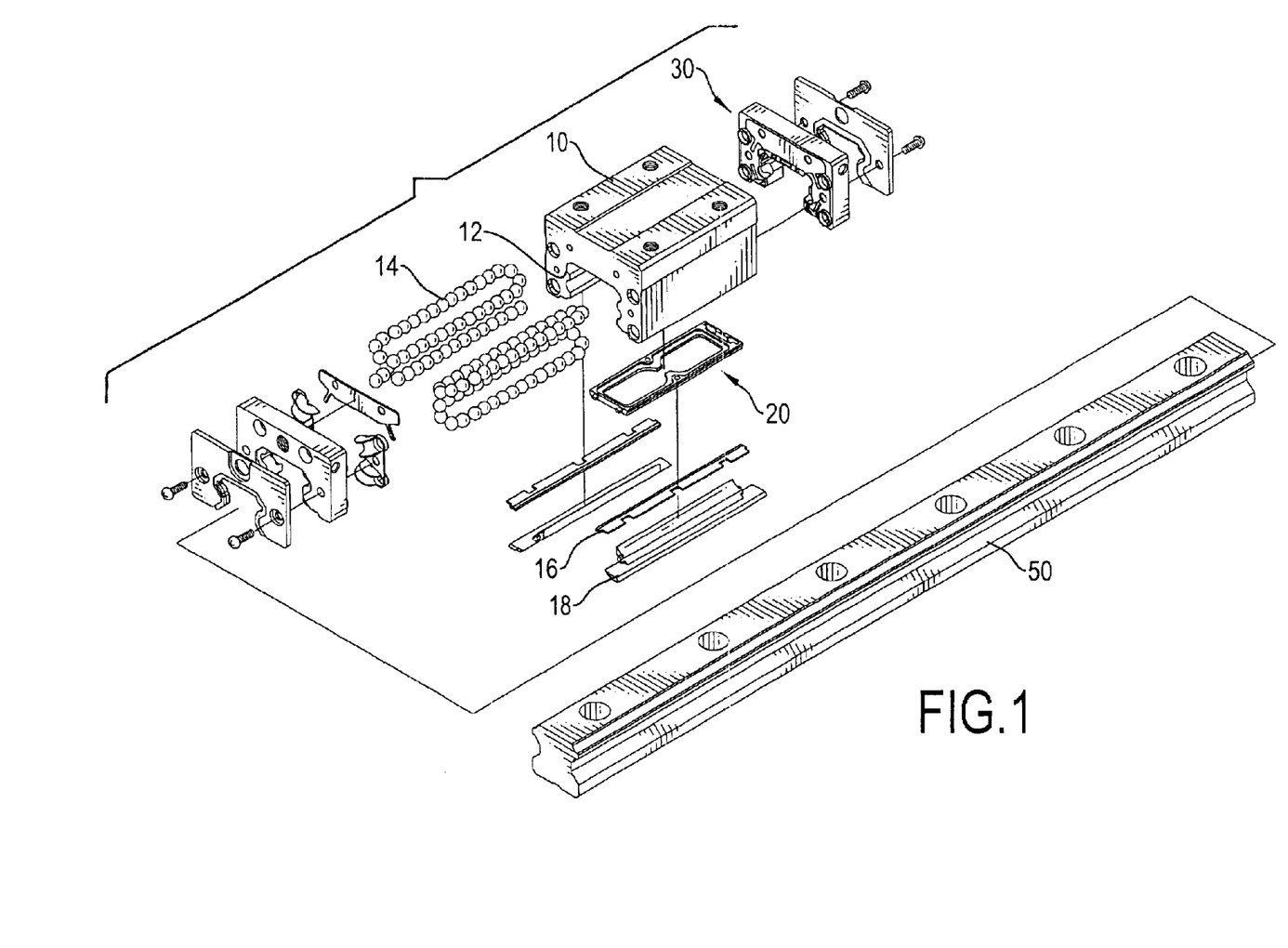
FIG. 1 is an exploded perspective view of a liner guide with a rail and a slider in accordance with the present invention.

With reference to FIG. 1, a slider for a liner guide in accordance with the present invention comprises a body (10), a retainer (20) and two side covers (30). The body (10) is inverse U-shaped and is composed of a bridge with a bottom and two sides extending from the bottom. Two ball channels (12) are respectively defined in the two sides of the body (10). Multiple balls (14) are rotatably received in the ball channels (12).

Figure 2:
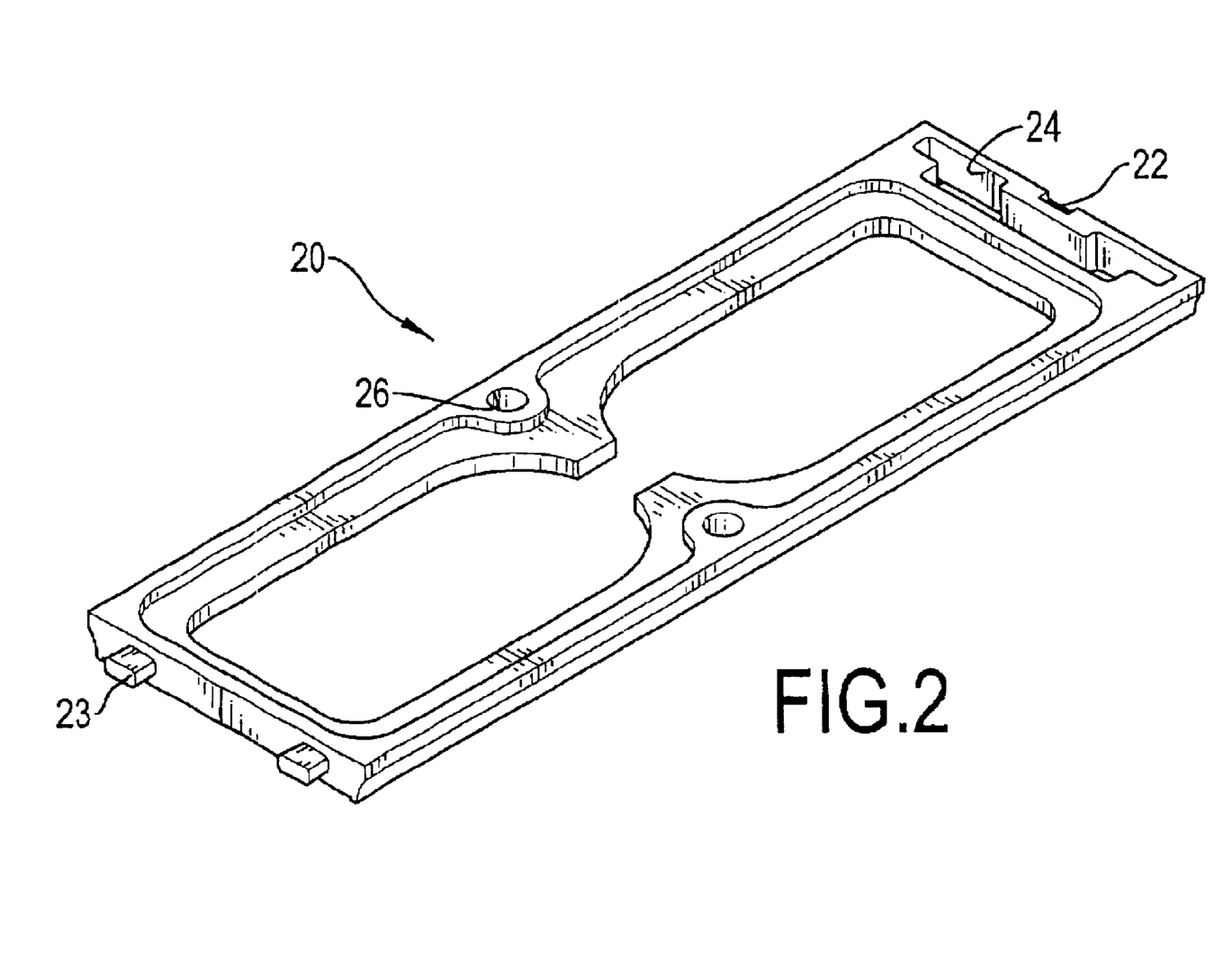
FIG. 2 is a perspective view of a retainer of the slider in FIG. 1.

The retainer (20) is attached between the side covers (30) and to the bottom of the bridge of the body (10) to keep the balls received in the ball channels (12) near the bottom of the bridge from escaping from the ball channels (12). With reference to FIGS. 1 and 2, the retainer (20) has a rectangular frame with two long sides, two short sides respectively connected to the side covers (30) and a middle portion. A resilient hole (24) is defined in one of the short sides of the rectangular frame to make the rectangular frame have a resilient capability. At least one tab (22,23) extends from each short side of the rectangular frame to engage with the corresponding one of the side covers (30). Two through holes (26) are defined in the middle portion of the rectangular frame.

Figure 3:
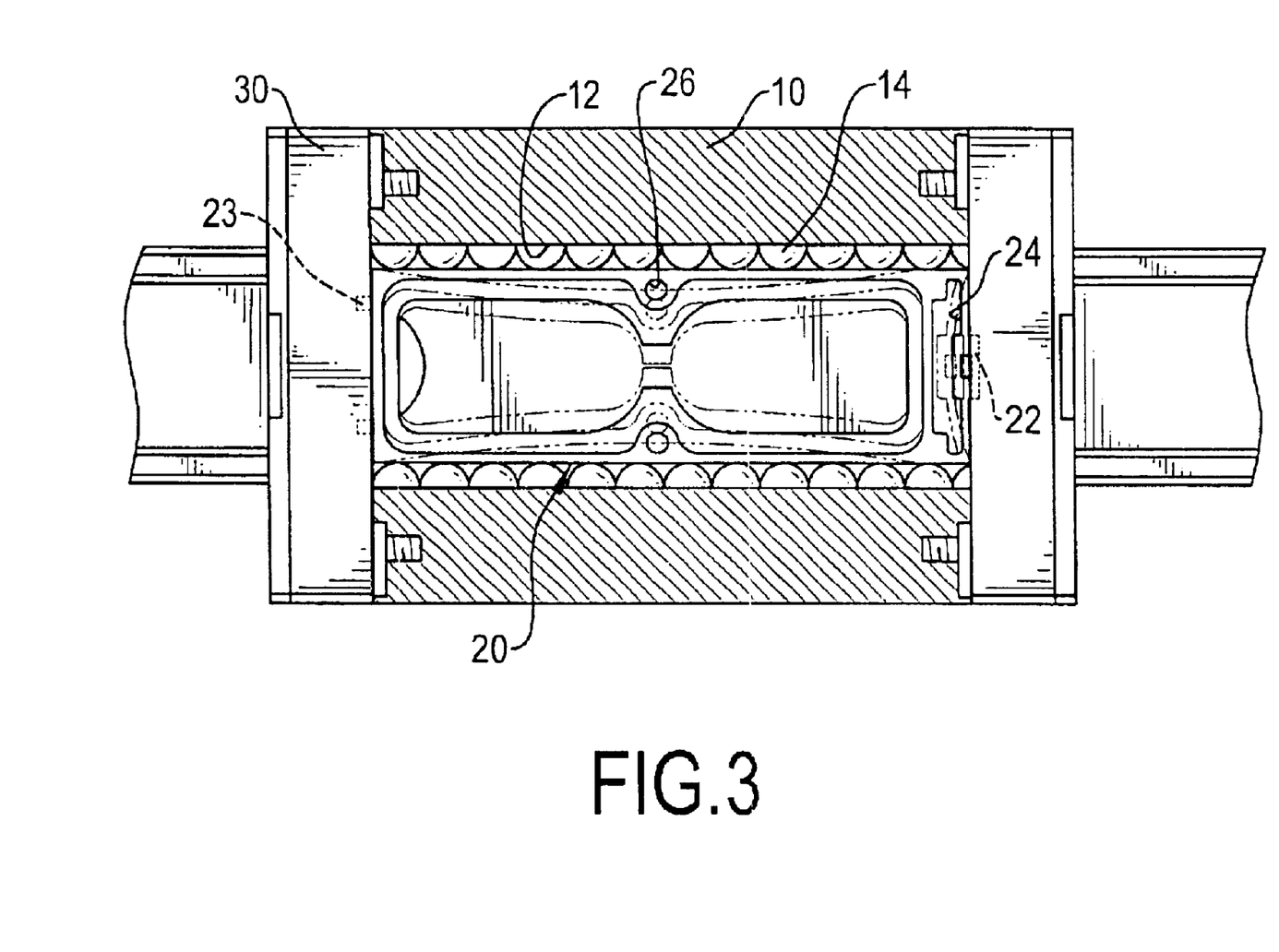
FIG. 3 is a top plan view in partial cross section of the liner guide with the slider in FIG. 1

With further reference to FIG. 3, to assemble the retainer (20) to the side covers (30), the tabs (23) on the short side of the rectangular frame away from the resilient hole (22) are engaged into the corresponding side cover (30) firstly. With the arrangement of the resilient hole (24), the short side of the rectangular frame with the resilient hole (24) can be compressed. Accordingly, the tab (22) on the short side of the rectangular frame near the resilient hole (24) can be engaged with the corresponding side cover (30) so as to attach the retainer (20) between the side covers (30). Therefore, the retainer (20) can be attached to the body (10) after the side covers (30) have been assembled to the body (10) and after the balls (14) have been fed into the ball channels (12). Thus, to assemble the slider is simplified and easy.

When the retainer (20) is attached to the body (10), the long sides of the rectangular frame will block parts of openings of the ball channels (12) near the bridge of the body (10). This can keep the balls (14) in the ball channel (12) from escaping from the ball channel (12). When some of the balls (14) are damaged due to wear or external force, the damaged balls (14) can be conveniently taken out from the ball channel (12) and replaced by means of disengaging the retainer (20) from the side covers (30). In another way, a tool is inserted into the through holes (26) in the retainer (20) to squeeze the middle portion of the rectangular frame to deform. Accordingly, the blocked opening of the ball channel (12) will be enlarged, and the damaged balls (14) can be replaced through the enlarged opening of the ball channel. Thus, to repair the slider is convenient and easy.

Figure 4:
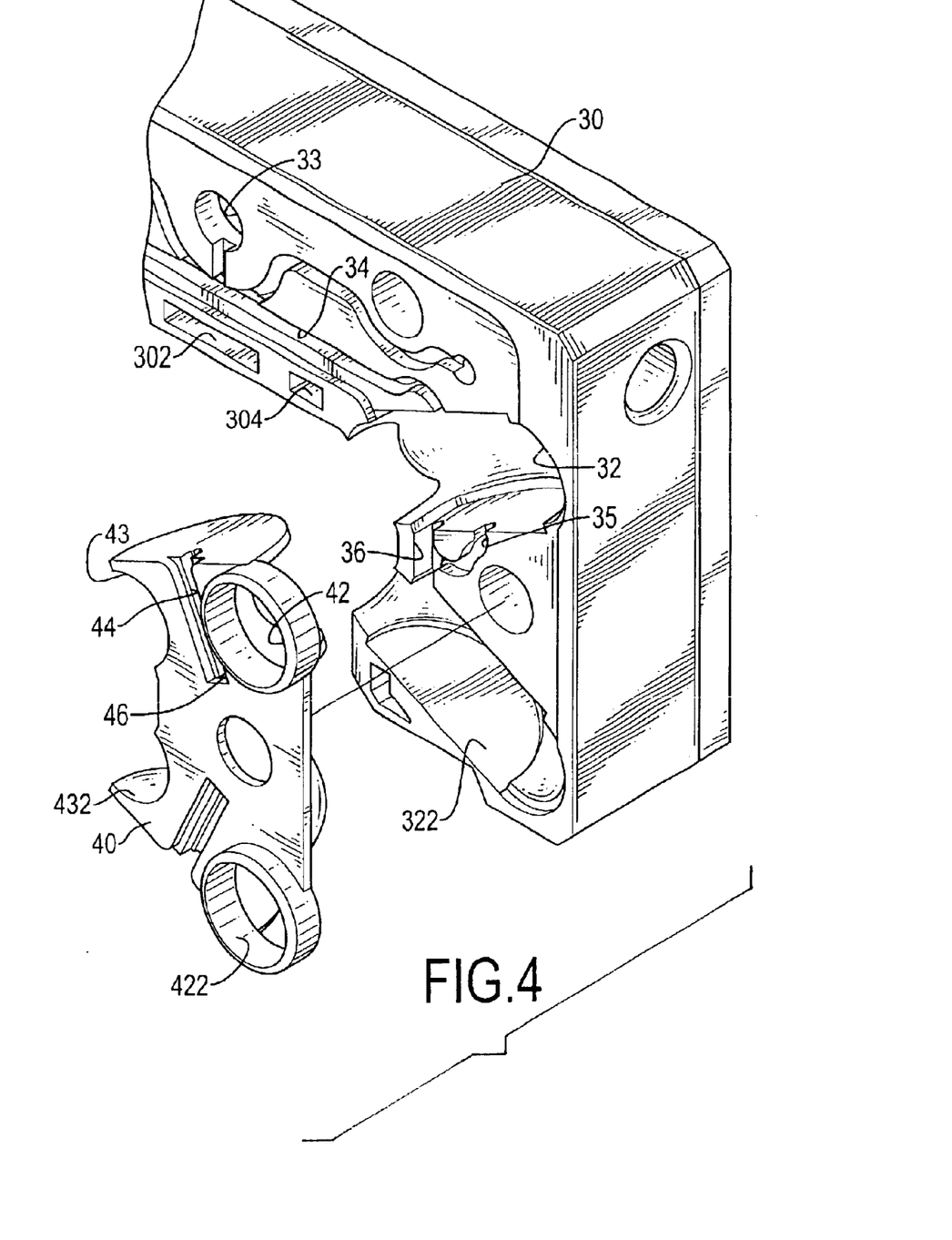
FIG. 4 is an enlarged exploded perspective view of one side cover of the slider in FIG. 1.
Figure 5:
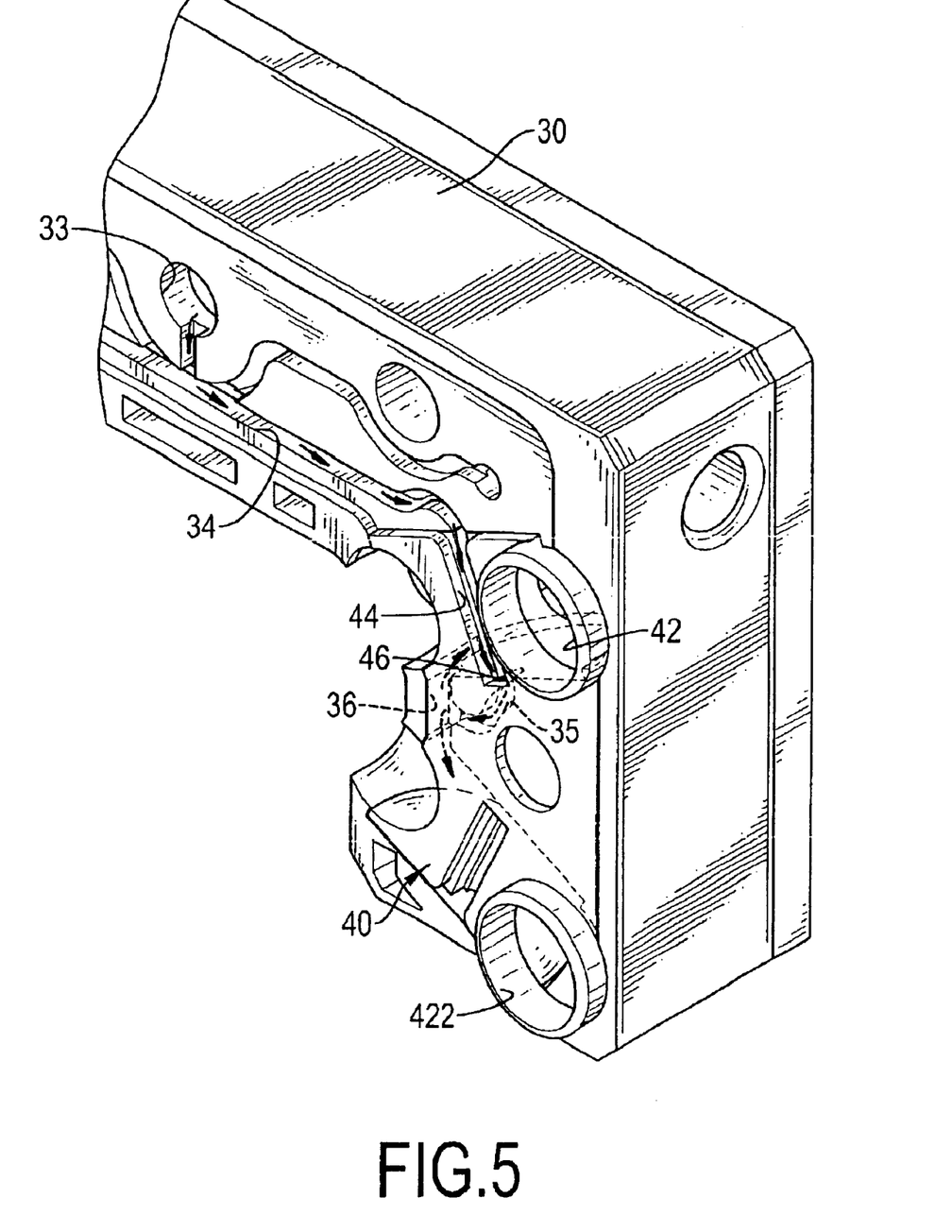
FIG. 5 is an enlarged perspective view of part of the side cover in FIG. 4.

With reference to FIGS. 1, 4 and 5, the side covers (30) are respectively attached to two ends of the body (10) and each has an oil channel communicating with the ball channels (12) in the body (10). Each respective side cover (30) has an inverse U shape and is composed of a bridge and two sides extending from the bridge. Each respective side cover (30) has multiple engaging recesses (302,304) defined in the bridge to selectively engage with the tabs (22,23) on the corresponding one end of the retainer (20) as shown in FIG. 2. Each respective side cover (30) has two ball cavities (32,322) defined in each respective side of the side cover (30) and each communicating with one of the ball channels (12) in the body (10). Two guide covers (40) are respectively attached to two sides of each respective side cover (30). Each respective guide cover (40) has a passage (42) and a notch (43) simultaneously communicating with one of the ball cavities (32,322) in the corresponding side of the side cover (30) and the corresponding one of the ball channels (12) in the body (10). Accordingly, the balls (14) in the ball channel (12) will move into the corresponding ball cavity (32,322) in the side cover (30) through the passage (42) in the side cover (40), and the balls (14) will move back to the ball channel (12) through the notch (43) from the ball cavity (32). Consequently, the balls (14) will move in the ball channel (12) and between the corresponding ball cavities (32,322) of the two side covers (30) in a loop.

The oil channel in each respective side cover (30) comprises an inlet (33), a branch channel (34), two guiding channels (44), two guiding holes (46), two connecting channels (35) and two injecting channels (36). The inlet (33) is defined through the bridge of the side cover (30). The branch channel (34) is defined in the bridge of the side cover (30) and communicates with the inlet (33). The branch channel (34) has two ends respectively extending to two sides of the side cover (30). The guiding channels (44) are respectively defined in the guide covers (40), and each guiding channel (44) communicates with one of the ends of the branch channel (34). The guiding holes (46) are respectively defined in the guide covers (40), and each guiding hole (46) communicates with the guiding channel (44) in the guide cover (40) in which the guiding hole (46) is defined. The connecting channels (35) are respectively defined in the sides of the side cover (30) and respectively communicate with the guiding holes (46) in the guide covers (40). Each injecting channel (36) is defined in one side of the side cover (30) and simultaneously communicates with the connecting channel (35) and the ball cavities (32,322) in the side of the side cover (30) in which the injecting channel (36) is defined.

When the lubricant oil is injected into each side cover (30) through the inlet (33), the lubricant oil will b e led into two sides of the side cover (30) through the branch channel (34). The lubricant oil is then led to the connecting channels (35) through the communicating guiding channel (44) and the guiding hole (46) in t he corresponding guide cover (40). The n, the b all cavities (32,322) in the side cover (30) will be synchronously filled with the lubricant oil through the injecting channels (36). Consequently, the ball channels (12) in the body (10) will be also synchronously filled with lubricant oil through the oil channels in the side covers (30), and a parallel oil channel system is provided. Accordingly, all of the balls (14) in the body (10) will be evenly coated with lubricant oil so as to provide a constant friction to the rail (90), such that the slider can move along the rail (90) in an excellent smooth and stable condition. In addition, the wear of the balls (14) can also be prevented, and the useful life of the slider is prolonged.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

What is claimed is:

1. A slider for a liner guide comprising:

an inverse U-shaped body with two ends composed of a bridge with a bottom and two sides extending from the bottom and comprising two ball channels respectively defined in the two sides;

multiple balls rotatably received in the ball channels;

two side covers respectively attached to the ends of the body and each having an oil channel communicating with the ball channels in the body; and a retainer attached between the side covers and to the bottom of the bridge of the body to keep the balls received in the ball channels near the bottom of the bridge from escaping from the corresponding ball channels, the retainer comprising:

a rectangular frame with two long sides corresponding to two of the ball channels in the body near the bridge, two short sides respectively connected to the side covers and a middle portion; and a resilient hole defined in one end of the rectangular frame to make the rectangular frame have a resilient capability.

2. The slider as claimed in claim 1, wherein the retainer has at least one tab extending from each end of the rectangular frame; and each side cover has multiple engaging recesses to selectively engage with the at least one tab on the corresponding one end of the retainer.

3. The slider as claimed in claim 2, wherein the retainer has two through holes defined in the middle portion of the rectangular frame.

4. The slider as claimed in claim 1, wherein each side cover has an inverse U shape and is composed of a bridge and two sides extending from the bridge;

each side cover has two ball cavities defined in each side of the side cover and each communicating with one of the ball channels in the body; and two guide covers are respectively attached to two sides of each side cover and each has a passage and a notch communicating with one of the ball cavities in the corresponding side of the side cover and the corresponding one of the ball channels in the body.

5. The slider as claimed in claim 4, wherein the oil channel in each side cover comprises:

an inlet defined through the bridge of the side cover;

a branch channel defined in the bridge of the side cover, communicating with the inlet and having two ends respectively extending to two sides of the side cover;

two guiding channels respectively defined in the guide covers and respectively communicating with two ends of the branch channel;

two guiding holes respectively defined in the guide covers and respectively communicating with the guiding channels in the guide covers in which the guiding holes are defined;

two connecting channels respectively defined in the sides of the side cover and respectively communicating with the guiding holes; and two injecting channels respectively defined in the sides of the side cover and each simultaneously communicating with the connecting channel and the ball cavities in the side of the side cover in which the injecting channel is defined.

* * * * *